US008838741B1

(12) United States Patent
Chandra Sekhar et al.

(10) Patent No.: US 8,838,741 B1
(45) Date of Patent: Sep. 16, 2014

(54) PRE-EMPTIVE URL FILTERING TECHNIQUE

(75) Inventors: Bharath Kumar Chandra Sekhar, Santa Clara, CA (US); Narasimham Kodukula, Sunnyvale, CA (US)

(73) Assignee: Trend Micro Incorporated, Tokyo (JP)

( * ) Notice: Subject to any disclaimer, the term of this patent is extended or adjusted under 35 U.S.C. 154(b) by 1815 days.

(21) Appl. No.: 11/899,607

(22) Filed: Sep. 5, 2007

(51) Int. Cl.
*G06F 15/16* (2006.01)

(52) U.S. Cl.
USPC ............................ 709/218; 709/217; 709/219

(58) Field of Classification Search
USPC .......................................... 709/218, 217, 219
See application file for complete search history.

(56) References Cited

U.S. PATENT DOCUMENTS

| 7,143,088 | B2 | 11/2006 | Green et al. |
| 7,155,451 | B1 | 12/2006 | Torres |
| 7,167,835 | B2 | 1/2007 | Coomber et al. |
| 7,174,377 | B2 | 2/2007 | Bernard et al. |
| 7,185,272 | B2 | 2/2007 | Pearce et al. |
| 7,194,464 | B2 | 3/2007 | Kester et al. |
| 7,219,299 | B2 | 5/2007 | Fields et al. |
| 7,228,303 | B1 | 6/2007 | Brenes et al. |
| 7,228,438 | B2 | 6/2007 | Bushmitch et al. |
| 7,249,315 | B2 | 7/2007 | Moetteli |
| 2003/0123465 | A1* | 7/2003 | Donahue ...................... 370/401 |

OTHER PUBLICATIONS

MD5 (Message-Digest algorithm5—Wikipedia, the free encyclopedia, pp. 1-6, webpage [online][retrieved on Aug. 16, 2007], retrieved from the internet: http://en.wikipedia.org/wiki/MD5.

Microsoft Internet Security and Accelerator Server, pp. 1-2, webpage [online][retrieved on Aug. 16, 2007], retrieved from the Internet: http://www.microsoft.com/isaserver/partners/accesscontrol.mspx.
Trend Micro Email Reputation Services, pp. 1-2, webpage [online][retrieved on Aug. 16, 2007], retrieved from the internet: http//us.trendmicro.com/us/products/enterprise/network-reputation-services/index.html.
Networkworld—What You Do Know Can Hurt You, "Cisco moving reputation services into network devices" Network World, pp. 1-3, webpage [online][retrieved on Aug. 16, 2007], retrieved from the internet: http//www.networkworld.com/news/2007/062507-cisco-ironport.html.
Networkworld—What You Do Know Can Hurt You, "IronPort adds Web reputation service to SenderBase" Network World, pp. 1-3, webpage [online][retrieved on Aug. 16, 2007], retrieved from the internet: http//www.networkworld.com/news/2006/012306-ironport. html.

* cited by examiner

*Primary Examiner* — Liangche A Wang
(74) *Attorney, Agent, or Firm* — Okamoto & Benedicto LLP

(57) ABSTRACT

Disclosed is a technique for pre-emptive URL filtering. A filtering engine may be configured to receive an original set of URLs from a web server along with a main content, the original set of URLs and the main content being intended for a web browser running in a client computer. The filtering engine may be running in a gateway. The filtering engine may check the original set of URLs for blocked URLs. The filtering engine may create a reconstructed set of URLs that suppresses blocked URLs in the original set of URLs. The filtering engine may send the client computer the reconstructed, instead of the original, set of URLs. This advantageously cuts down on the number of HTTP connections that have to be made by the browser, and corresponding URL filtering at the gateway, in situations where there is a blocked URL in the original URL set.

20 Claims, 3 Drawing Sheets

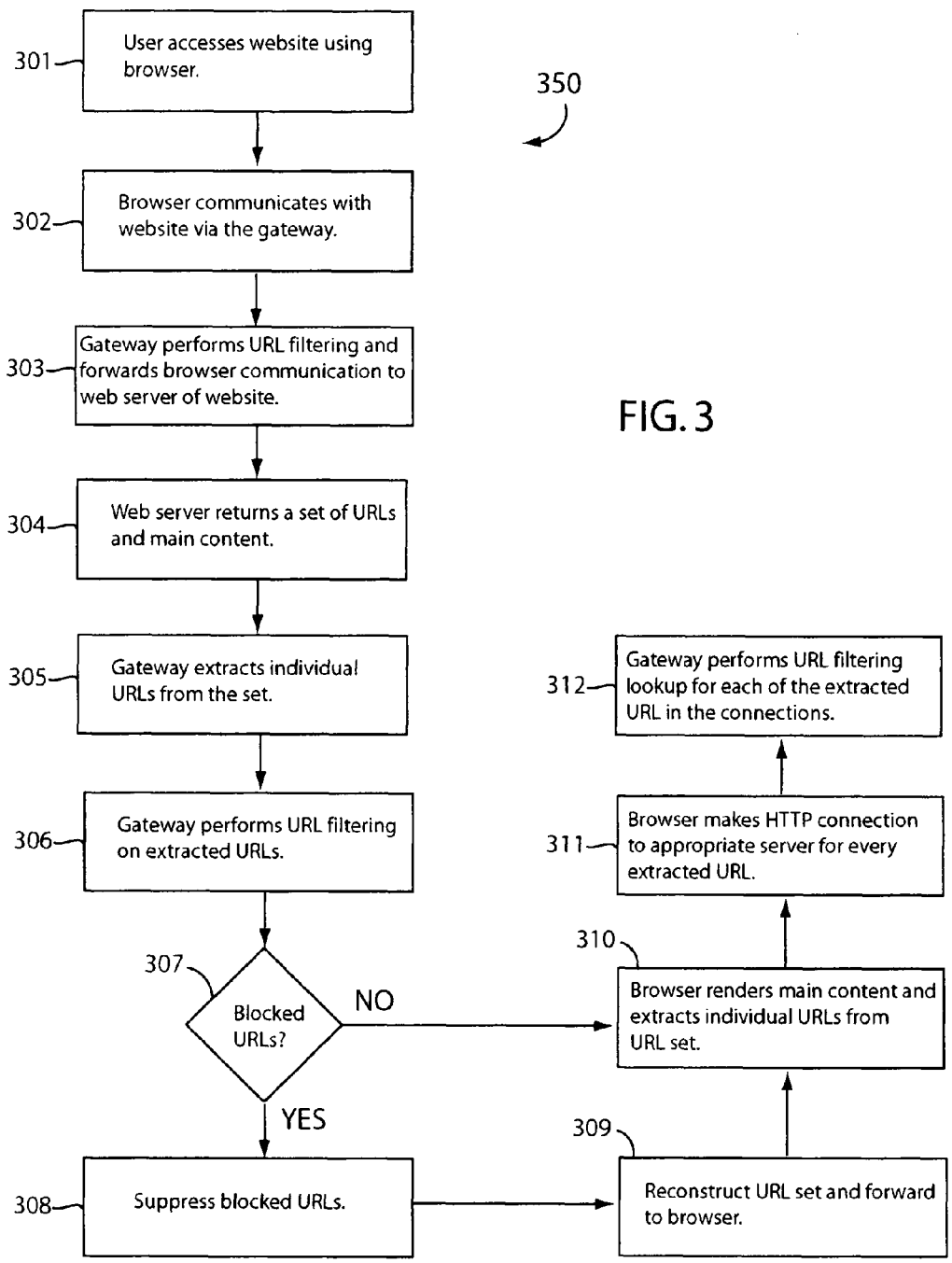

PRE-EMPTIVE URL FILTERING TECHNIQUE

BACKGROUND OF THE INVENTION

1. Field of the Invention

The present invention relates generally to computer security, and more particularly but not exclusively to methods and apparatus for filtering computer network traffic.

2. Description of the Background Art

Computers coupled to the Internet may access websites to view various kinds of information. The websites, which are hosted on web servers, include one or more web pages that may be displayed on a web browser of a user's client computer. Each web page has a corresponding network address, commonly referred to as a URL (uniform resource locator), that allows a web browser to locate the web page. The web browser may be pointed to the URL to render the web page on the browser for viewing by the user.

URL filtering involves monitoring of URLs to identify those that belong to prohibited websites. The websites may be prohibited by policy or other reasons. For example, a corporate computer network may prevent viewing of web pages from pornography websites. In that case, a URL filter may be configured to block URLs belonging to pornography websites. When a web browser attempts to access one of the blocked pornography websites, the URL filter will recognize the URL and block the access.

URL filtering may be performed at a gateway of a computer network. The conventional approach to URL filtering at a gateway is as follows. A user employs a web browser to access a website. The browser accordingly connects to the website by way of the gateway. The gateway performs URL filtering on the website's URL, and forwards the browser connection to the website if a policy allows access to the website. The server hosting the website returns a set of URLs, which may be in HTML (hyper text markup language) form or gzipped file, along with the main content. The browser renders the main content and then extracts individual URLs from the set. For every extracted URL, the browser makes a separate HTTP (hyper text transfer protocol) connection to the appropriate server. Thus, if there are 25 URLs in the set, the browser opens 25 simultaneous HTTP connections. The gateway performs URL filtering lookup for each of the HTTP connections and takes appropriate actions (e.g., block, allow, etc.).

As can be appreciated, even when the gateway utilizes caching functionality to ensure that URL filtering lookups are done locally, each of the aforementioned HTTP connections consumes the gateway's computing resources, thereby affecting the gateway's performance.

SUMMARY

In one embodiment, a filtering engine is configured to receive an original set of URLs from a web server along with a main content, the original set of URLs and the main content being intended for a web browser running in a client computer. The filtering engine may be running in a gateway. The filtering engine may check the original set of URLs for blocked URLs. The filtering engine may create a reconstructed set of URLs that suppresses blocked URLs in the original set of URLs. The filtering engine may send the client computer the reconstructed, instead of the original, set of URLs. This advantageously cuts down on the number of HTTP connections that have to be made by the browser, and corresponding URL filtering at the gateway, in situations where there is a blocked URL in the original URL set.

These and other features of the present invention will be readily apparent to persons of ordinary skill in the art upon reading the entirety of this disclosure, which includes the accompanying drawings and claims.

DESCRIPTION OF THE DRAWINGS

FIG. 3 shows a flow diagram of a method of performing URL filtering in accordance with an embodiment of the present invention.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that some components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may be executed by a processor. Software components may be implemented in logic circuits, for example. Components may be implemented separately in multiple modules or together in a single module.

Figure 1:
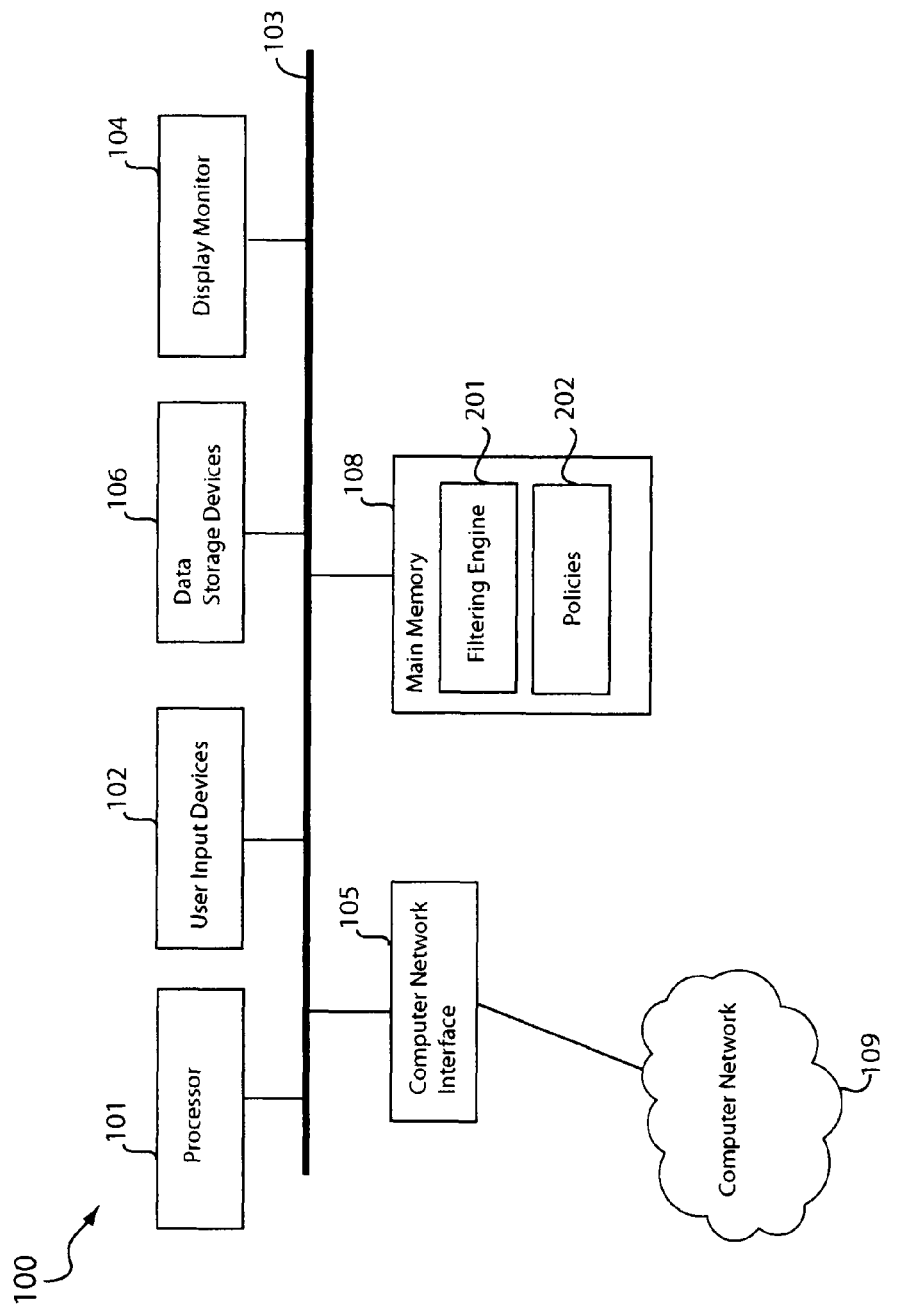
FIG. 1 shows a schematic diagram of a computer in accordance with an embodiment of the present invention.

Referring now to FIG. 1, there is shown a schematic diagram of a computer 100 in accordance with an embodiment of the present invention. The computer 100 may be employed as a gateway computer, for example. The computer 100 may have less or more components to meet the needs of a particular application. The computer 100 may include a processor 101, such as those from the Intel Corporation or Advanced Micro Devices, for example. The computer 100 may have one or more buses 103 coupling its various components. The computer 100 may include one or more user input devices 102 (e.g., keyboard, mouse), one or more data storage devices 106 (e.g., hard drive, optical disk, USB memory), a display monitor 104 (e.g., LCD, flat panel monitor, CRT), a computer network interface 105 (e.g., network adapter, modem), and a main memory 108 (e.g., RAM).

In the example of FIG. 1, the main memory 108 includes a filtering engine 201 and policies 202. The filtering engine 201 and the policies 202 may be loaded from the data storage device 106 to the main memory 108 for execution by the processor 101. The computer network interface 105 may be coupled to a computer network 109, which in this example includes the Internet.

The filtering engine 201 may comprise computer-readable program code for monitoring network addresses on network traffic to enforce the policies 202. In one embodiment, the filtering engine 201 performs URL filtering. The filtering engine 201 may be configured to perform URL filtering by examining an original set of URLs for blocked URLs, creating a reconstructed URL set that suppresses the blocked URLs, and forwarding the reconstructed URL set instead of the original set of URLs to the browser intended to receive the original set of URLs. A blocked URL may be one that is prohibited from being accessed in a particular computer or computer network. The policies 202 may dictate that content or data from a blocked URL is to be blocked from being received in or transmitted from a computer in a particular computer network. In one embodiment, the filtering engine 201 runs on a gateway to block content and other data of blocked URLs.

In one embodiment, the filtering engine 201 is configured to determine if a URL is blocked by receiving a URL and passing that URL to a reputation service to determine the reputation of the URL, such as the type of information available from the URL, activities associated with the URL, rating information of the URL, or category of the URL. For example, the reputation service may keep a listing of URLs of servers for particular categories, such as pornography, phishing, fraudulent schemes, etc. The reputation service may also provide rating information for URLs of servers, such as how long a URL has been in existence, how many times its associated IP address has been changed, etc. The filtering engine 201 may take advantage of this service by providing the URL to the reputation service to determine if the URL is associated with a category that is prohibited by the policies 202. For example, the policies 202 may prohibit access to web pages from pornography sites by designating the URLs of pornography sites as blocked. The filtering engine 201 may also be configured to determine if a URL is blocked by consulting a local listing of blocked URLs; such a local listing may be included in the policies 202.

The policies 202 may include a listing of blocked URLs. The filtering engine 201 may be configured to block network communications involving blocked URLs. As a particular example, the filtering engine 201 may be configured to block web browsers from accessing web pages with URLs indicated in the policies 202 as blocked.

Figure 2:
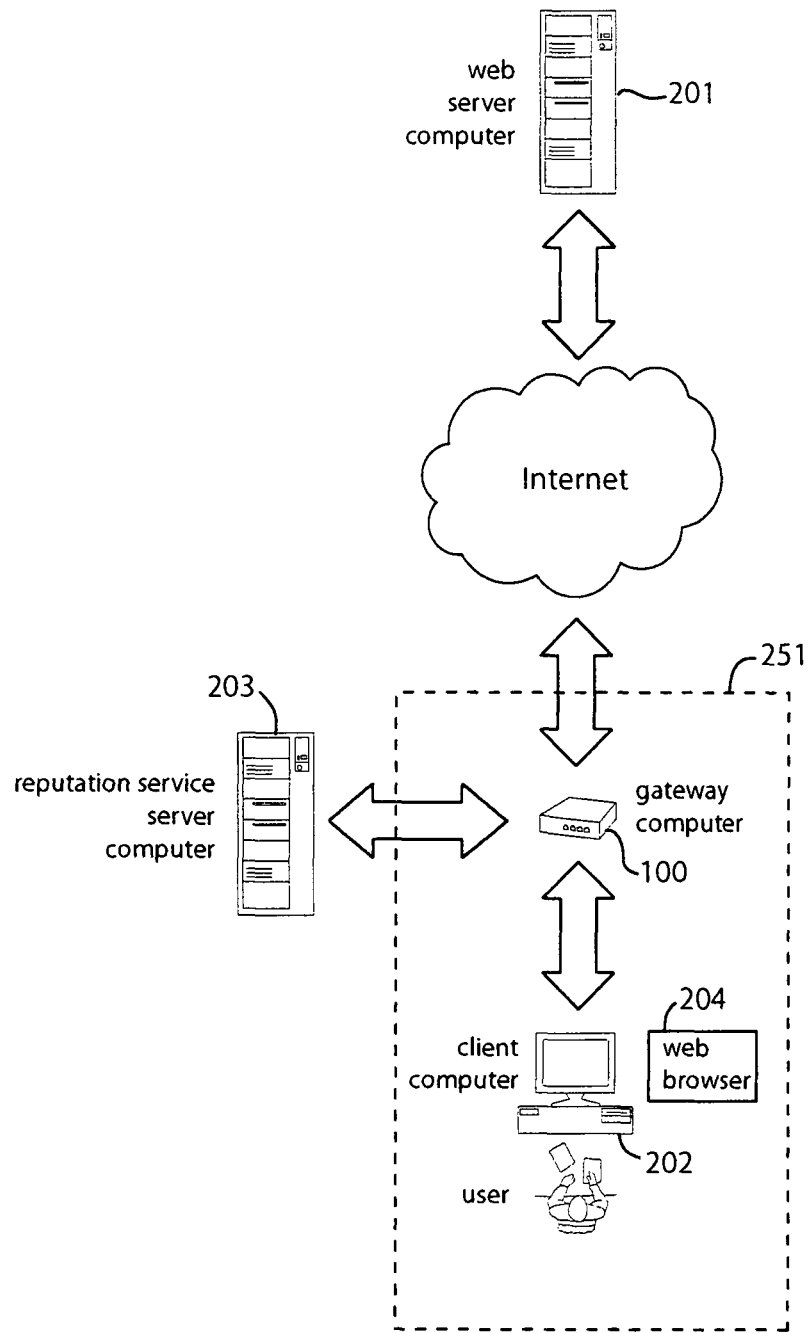
FIG. 2 schematically shows a computing environment in accordance with an embodiment of the present invention.

FIG. 2 schematically shows a computing environment in accordance with an embodiment of the present invention. In the example of FIG. 2, a computer network 251 includes one or more computers 100 and client computers 202; only one of each is shown for clarity of illustration. The computer 100 is configured as a gateway computer in the example of FIG. 2. As a gateway, computer network communications between the Internet and the network 251 pass through the computer 100. A client computer 202 includes a web browser 204 to access a website hosted by a web server computer 201 on the Internet.

The computer 100 may consult a reputation service server computer 203 to get reputations of URLs received in the computer 100. The server computer 203 may be accessible over the Internet, locally located within the network 251, or remotely located in another computer network accessible from the network 251. The functionality of the server computer 203 may also be included in the computer 100. For example, the computer 100 may include a database of URLs of websites of prohibited categories, such as pornography, phishing, etc. In one embodiment, the server computer 203 is part of reputation services of Trend Micro, Inc. Other reputation services available from other computer security vendors may also be used without detracting from the merits of the present invention.

FIG. 3 shows a flow diagram of a method 350 of performing URL filtering in accordance with an embodiment of the present invention. The method 350 is explained using the components shown in FIG. 2 as examples. As can be appreciated, other components may also be used without detracting from the merits of the present invention.

The method 350 begins with the user employing the web browser 204 running on the client computer 202 to access a website hosted by the web server computer 201 (step 301). To access the website, the user enters the URL of the website (e.g., URL of the website's main page) on the address field of the browser 204. The browser 204 communicates with the website by way of a gateway, which is the computer 100 in this example (step 302). The filtering engine 201 receives the browser communication to the website, performs URL filtering on the URL of the website, and, assuming the URL of the website is not blocked or otherwise against the policies 202, allows the browser communication to be forwarded to the web server 201 (step 303). The browser 204 would be prevented by the filtering engine 201 from communicating with the web server 201, and the method would end at this point, if the URL of the website is blocked.

The web server 201 receives the browser communication and accordingly returns a main content and a set of URLs (step 304). The set of URLs may be in HTML form or gzipped file, for example. The set of URLs may include URLs of other servers whose contents are to be displayed along with the main content, which in this example comprises a web page. The filtering engine 201 extracts individual URLs from the URL set obtained from the web server 201 (step 305) and performs URL filtering on each extracted URL (step 306). For example, the filtering engine 201 may consult the reputation service server computer 203 to determine if any of the extracted URLs belongs to a category of websites that is blocked according to the policies 202. As another example, the filtering engine 201 may consult a local cache of reputation information obtained from previously performed URL filtering. The local cache of reputation information may be updated by the filtering engine 201 to replace expired cached reputation information or when performing URL filtering on a URL that is not in the local cache. The filtering engine 201 may also simply compare the extracted URLs to a local listing of blocked URLs included in the policies 202 in the computer 100.

Performing URL filtering at this stage, i.e., prior to the web browser 204 receiving the main content and the set of URLs, advantageously allows the filtering engine 201 to send a single query to the reputation service server computer 203 for reputation of the multiple URLs in the URL set. The filtering engine 201 may then cache responsive results from the server computer 203 in the local cache, increasing the cache hit rate, reducing network bandwidth usage, and improving latency from the perspective of end users. This is in marked contrast to the conventional approach of sending a reputation service server computer a single query per URL.

In one embodiment, the filtering engine 201 is configured to suppress blocked URLs (step 307 to step 308). In this example, the filtering engine 201 may suppress any of the extracted URL that is blocked by, e.g., replacing a blocked URL with an invalid or non-resolvable URL. In that case, the filtering engine 201 may reconstruct the URL set to suppress the blocked extracted URLs (step 309). The filtering engine 201 then forwards the reconstructed URL set, which now suppresses blocked URLs, to the browser 204 (step 309). The browser 204 renders the main content and extracts individual URLs from the reconstructed URL set (step 310). In this example, the browser 204 displays the web page from the website and initiates displaying on the web page content from the URLs extracted from the reconstructed URL set. Accordingly, the browser 204 makes HTTP connections to a corresponding server for each URL in the reconstructed URL set (step 311). The filtering agent 201 then performs URL filtering for each URL in the HTTP connections (step 312).

If none of the URLs in the original URL set (i.e., as originally received from the web server computer 201 in step 304) is blocked, the filtering engine 201 may simply forward the original URL set to the browser 204 (step 307 to step 310), which then makes HTTP connections to corresponding servers for every URL in the original URL set (step 311). The filtering agent 201 performs URL filtering on URLs in the HTTP connections (step 312)

In the case where there are blocked URLs in the original URL set, note that the number of HTTP connections processed by the filtering agent 201 is reduced because of the URL pre-emptive filtering performed on the original URL set (see step 306) prior to providing the original URL set to the browser 204. Blocked URLs are suppressed in the reconstructed URL set, preventing the browser 204 from connecting to them. In marked contrast, in the conventional approach, the browser 204 would have to make an HTTP connection even for blocked URLs. That is, the browser 204 would have to make an HTTP connection through the gateway to identify blocked URLs in the original URL set. For example, if there are 25 URLs in a URL set and 14 of those are blocked, the browser 204 would still need to open 25 HTTP connections to determine that 14 of the URLs are blocked. These 14 HTTP connections waste bandwidth and gateway computing resources. In marked contrast, in embodiments of the present invention, the blocked URLs are pre-filtered at the gateway prior to being received by the browser. This results in only 11 HTTP connections (25 minus 14 HTTP connections) in the just mentioned example. Embodiments of the present invention are thus especially beneficial in current online scenarios where an otherwise legitimate and common (e.g., news related) website may be displaying content that is restricted or prohibited by policy (e.g., advertisements for intimate apparel, dating service, etc.).

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method of performing URL filtering at a gateway, the method comprising:
    receiving at a gateway computer an original URL set from a web server hosting a website in communication with a client computer running a web browser, the original URL set being sent by the web server along with a main content to the client computer in response to a request from the web browser;
    at the gateway computer, determining if any URL in the original URL set is blocked;
    creating a reconstructed URL set that suppresses a blocked URL in the original URL set such that the web browser does not create an HTTP connection for the blocked URL when the client computer receives the reconstructed URL set; and
    forwarding the reconstructed URL set to the client computer.

2. The method of claim 1 wherein determining if any URL in the original URL set is blocked comprises:
    determining if any URL in the original URL set belongs to a category that is against a policy enforced by the gateway.

3. The method of claim 1 wherein determining if any URL in the original URL set is blocked comprises:
    sending a single query to a reputation service server computer for reputations of URLs in the original URL set; and
    updating a local cache with the reputations of the URLs in the original URL set.

4. The method of claim 1 wherein determining if any URL in the original URL set is blocked comprises:
    determining if any of the URL in the original URL set is included in a listing of blocked URLs.

5. The method of claim 1 further comprising:
    at the gateway computer, determining if any URL in HTTP connections made by the web browser for URLs in the reconstructed URL set is blocked.

6. The method of claim 1 wherein the main content comprises a web page and URLs in the original URL set are for contents to be displayed on the web page.

7. The method of claim 1 wherein determining if any URL in the original set is blocked comprises consulting policies in the gateway computer.

8. The method of claim 7 wherein the policies indicate categories of blocked URLs.

9. A computer with memory and a processor for executing computer-readable program code in the memory, the memory comprising:
    a filtering engine configured to look for blocked URLs in an original set of URLs received from a web server, to reconstruct the original set of URLs into a reconstructed set of URLs that suppresses blocked URLs in the original URL set, and to forward the reconstructed set of URLs instead of the original set of URLs to a web browser over a computer network; and
    a set of policies indicating whether or not a URL is a blocked URL.

10. The computer of claim 9 wherein the computer comprises a gateway computer and the web browser is running on a client computer in the computer network that includes the gateway computer.

11. The computer of claim 9 wherein the set of policies indicates categories of URLs that are blocked.

12. The computer of claim 11 wherein the categories include pornography.

13. The computer of claim 11 wherein the filtering engine looks for blocked URLs in the original URL set by determining a reputation of each URL in the original URL set.

14. The computer of claim 11 wherein the filtering engine is configured to receive HTTP connections from the web browser for URLs in the reconstructed set of URLs.

15. A computer-implemented method of filtering network addresses on network traffic, the method comprising:
    receiving in a first computer an original set of network addresses from a server computer, the original set of network addresses being intended to be received by a second computer;
    in the first computer, determining if a network address in the original set of network addresses is blocked in a first computer network that includes the first computer and the second computer;
    changing the original set of network addresses into a reconstructed set of network addresses that suppresses blocked network addresses in the original set of network addresses; and forwarding the reconstructed set of network addresses instead of the original set of network addresses to the second computer.

16. The method of claim 15 further comprising:

receiving in the first computer HTTP connections from the second computer, the HTTP connections being network addresses in the reconstructed set of network addresses; and in the first computer, determining if a network address in the HTTP connections is blocked.

17. The method of claim 15 wherein the first computer comprises a gateway computer and the second computer comprises a client computer.

18. The method of claim 15 wherein determining if a network address in the original set of network addresses is blocked comprises consulting policies in the first computer.

19. The method of claim 15 wherein determining if a network address in the original set of network addresses is blocked comprises consulting a listing of blocked network addresses.

20. The method of claim 15 wherein the original set of network addresses comprises URLs.

* * * * *